(12) United States Patent
Mandela et al.

(10) Patent No.: US 12,413,077 B2
(45) Date of Patent: Sep. 9, 2025

(54) SYSTEMS AND METHODS FOR SYNCHRONIZATION OF INVERTERS IN A MICROGRID

(71) Applicant: BLOOM ENERGY CORPORATION, San Jose, CA (US)

(72) Inventors: Chaitanya Mandela, San Jose, CA (US); Ranganathan Gurunathan, San Jose, CA (US); Ayyapparudrasimha Yedida, San Jose, CA (US); Badrinarayanan Thiruvengadaswamy, San Jose, CA (US); Vishal Gopalakrishnan, San Jose, CA (US); Saravana Narayanasamy, San Jose, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 18/930,379

(22) Filed: Oct. 29, 2024

(65) Prior Publication Data
US 2025/0141235 A1    May 1, 2025

Related U.S. Application Data

(60) Provisional application No. 63/594,931, filed on Oct. 31, 2023.

(51) Int. Cl.
*H02J 3/44* (2006.01)
*H02J 3/00* (2006.01)

(52) U.S. Cl.
CPC .............. *H02J 3/44* (2013.01); *H02J 3/0012* (2020.01)

(58) Field of Classification Search
CPC ................................. H02J 3/44; H02J 3/0012
USPC ........................................................ 700/295
See application file for complete search history.

(56) References Cited

U.S. PATENT DOCUMENTS

| | | | |
|---|---|---|---|
| 11,451,065 B1* | 9/2022 | Worku ................. | G05B 19/042 |
| 2014/0139260 A1* | 5/2014 | Shankar .................. | H02M 1/32 |
| | | | 363/55 |
| 2015/0295581 A1* | 10/2015 | Shi ........................... | H02J 3/40 |
| | | | 700/287 |
| 2016/0266559 A1* | 9/2016 | Shi ....................... | G05B 19/042 |
| 2016/0329709 A1* | 11/2016 | Park ......................... | H02J 3/46 |
| 2017/0229870 A1* | 8/2017 | Singh ...................... | H02J 3/381 |

(Continued)

*Primary Examiner* — Chun Cao
(74) *Attorney, Agent, or Firm* — Evergreen Valley Law Group; Kanika Radhakrishnan

(57) ABSTRACT

Systems and methods for synchronization of microgrid inverters in a microgrid are disclosed. The system includes a microgrid and a master inverter. The master inverter is operatively connected to a main grid and a plurality of microgrid inverters of the microgrid. The master inverter determines one or more electrical parameters for the main grid and the microgrid. The system detects one or more predefined fault conditions in at least one of the microgrid and the main grid based, at least in part, on the one or more electrical parameters. In response to detection of the one or more predefined conditions, the system generates a synchronization signal including at least a voltage reference to be maintained at a microgrid bus. The master inverter then transmits a synchronization signal that operates to match a voltage at the microgrid bus with the voltage reference comprised in the synchronization signal.

16 Claims, 7 Drawing Sheets

(56) References Cited

U.S. PATENT DOCUMENTS

| | | | |
|---|---|---|---|
| 2017/0237256 A1* | 8/2017 | Majumder | H02J 3/06 |
| | | | 307/80 |
| 2019/0334351 A1* | 10/2019 | Majumder | G05B 9/02 |
| 2023/0019768 A1* | 1/2023 | Fletcher | H02J 3/44 |
| 2023/0318306 A1* | 10/2023 | Elfouly | H02J 3/08 |
| | | | 700/286 |
| 2024/0162838 A1* | 5/2024 | Pmsvvsv | H02H 7/1227 |

* cited by examiner

SYSTEMS AND METHODS FOR SYNCHRONIZATION OF INVERTERS IN A MICROGRID

TECHNICAL FIELD

The present invention relates to the field of distributed power generation and, more particularly, to systems and methods for synchronization of inverter sources in a microgrid and with a main grid in a microgrid-based site.

BACKGROUND

In recent years, with an increase in energy demand and a requirement to control pollution, microgrids using renewable energy are in demand. Microgrids offer a promising solution to enhance the reliability, efficiency, and resilience of a region's energy infrastructure. A microgrid can comprise a local low-voltage power system that offers many advantages over a main power grid in terms of security, power autonomy, and the ability to incorporate distributed generation, including renewable energy. A microgrid can include a control system to operate the microgrid connected to the grid or is landed, with the control system having one or more controllers. In Alternating Current (AC) microgrids, the use of renewable energy requires Direct Current (DC) to AC conversion using inverters. A microgrid (or an electrical network of microgrids) with a large number of distributed energy sources, such distributed energy sources including solar panels, wind turbines, batteries, and backup generators, usually needs multiple inverters.

Microgrids offer several advantages, including increased energy efficiency, reduced greenhouse gas emissions, and enhanced resilience against grid disturbances. One critical aspect of microgrid operation is synchronization with the main grid. This process ensures seamless energy exchange, grid stability, and the ability to operate autonomously when necessary.

Synchronization of the microgrid bus voltage with the main grid is essential prior to interconnecting them, as failure to do so could lead to excessive inrush currents from the grid during the closed transition between the microgrid and the main grid. Achieving phase and frequency alignment between the microgrid bus voltage and the main grid during islanded operation, particularly when the load varies intermittently, presents a formidable challenge when employing droop control. While it is feasible to correct the microgrid's frequency to match that of the main grid using a microgrid controller that dynamically adjusts the droop curve accordingly, this synchronization is only momentary and not sustained during continuous operation of the grid.

Conventional droop control has several limitations, with one notable limitation being the potential for synchronization loss when faced with prolonged periods of short circuits or overloads. Conventional droop control methods achieve synchronization between connected sources by providing negative feedback based on the circulating power between the sources. However, during bolted/low impedance short circuits between the sources, the negative feedback of droop control doesn't exist as the relation between the power flow between sources and the source frequency is no longer valid.

In the context of inverters, distinct from synchronous machines characterized by current limitations, it is essential to acknowledge that the power flow equation loses its validity when confronted with short-circuit or overload conditions. This deviation arises as the assumed voltage source model ceases to be valid once the inverter reaches its current limit.

As the negative feedback provided by the droop curve is non-existent during such short circuit conditions, the frequencies of the sources connected to the microgrid might drift apart from each other. If the duration of the short circuit fault is longer (e.g. greater than 20 cycles), this frequency drift between sources results in phase-shift between them. Once the short circuit fault is cleared, the integrated phase shift between the sources causes a loss of synchronization between the sources, resulting in circulating power between them. This leads to instability in the microgrid, resulting in a voltage or frequency collapse of the microgrid.

The above-mentioned limitations render grid-forming inverters controlled by droop susceptible to issues during short circuits or overloads, potentially leading to a loss of synchronization in such situations. In numerous microgrid setups, extended periods of short circuits lasting more than one second are treated as blackout conditions, with subsequent recovery primarily involving a black start procedure. This scenario leads to a substantial downtime in load supply, especially in the case of larger microgrids, which require the resynchronization of all interconnected power sources as part of the restoration process.

In the realm of traditional droop control methodologies, there exists an additional limitation related to frequency regulation. Specifically, the frequency of the bus voltage within the microgrid becomes contingent upon the grid's load when the interconnected sources within the microgrid adhere to droop control principles. This reliance on the droop characteristic, which is based on droop between no-load and full-load frequencies for equitable power distribution, results in frequency fluctuations of the bus voltage corresponding to variations in the microgrid's load. The steepness of the droop curves establishes the bandwidth of the droop control mechanism, and consequently, the efficacy of the droop control method is more pronounced with higher droop gradients. Accordingly, synchronization and power sharing among sources are more precise when employing elevated droop settings. Conversely, employing excessively minimal droop values (e.g., less than 0.1 Hz) between no-load and full-load frequencies yields a nearly flat droop curve, thereby diminishing the effectiveness of the droop control. Consequently, droop settings typically fall within the range of 1-3% (equivalent to 0.6-1.8 Hz in a 60 Hz system) within the majority of microgrids.

For loads and grid-tied sources that demonstrate high sensitivity to grid frequency fluctuations, the frequency regulation provided by droop control may prove inadequate. Furthermore, controlling the Rate of Change of Frequency (RoCoF) within the microgrid is critical during scenarios involving step loads, particularly when the droop setting is higher (for e.g. >0.5 Hz difference between no load and full load frequencies).

Hence, there is a technological need for an improved system and method for synchronization of inverter sources in a microgrid while also maintaining synchronism with a main grid whenever prompted while overcoming the above-mentioned limitations of the conventional droop control method.

SUMMARY

Various embodiments of the present disclosure provide systems and methods for synchronization of inverter sources in a microgrid and with a main grid in a microgrid-based site.

In an embodiment, a system for synchronizing a plurality of microgrid inverters in a microgrid is disclosed. The system includes a master inverter operatively connected to a main grid and a plurality of microgrid inverters of the microgrid. The master inverter is configured to monitor the main grid and the microgrid to determine one or more electrical parameters for the main grid and the microgrid. The master inverter is further configured to detect one or more predefined conditions related to a fault that occurred in at least one of the microgrid and the main grid based, at least in part, on the one or more electrical parameters. In response to detection of the one or more predefined conditions, the master inverter is configured to generate a synchronization signal based on the one or more electrical parameters for the main grid and/or the microgrid in response to detection of the one or more predefined conditions. The synchronization signal includes at least a voltage reference to be maintained at a microgrid bus to synchronize the microgrid inverters. The microgrid bus is a bus through which the plurality of microgrid inverters are connected. The master inverter is further configured to transmit the synchronization signal to the plurality of microgrid inverters to adjust respective output electrical parameters of the plurality of microgrid inverters. The respective output electrical parameters are adjusted by each of the plurality of microgrid inverters to match voltage at the microgrid bus with the voltage reference comprised in the synchronization signal. The control of the voltage at the microgrid bus corresponding to the voltage reference facilitates synchronization of the microgrid inverters in the microgrid.

In another embodiment, a method is disclosed that includes monitoring the main grid and the microgrid to determine one or more electrical parameters for the main grid and the microgrid. The method further includes detecting one or more predefined conditions related to a fault that occurred in at least one of the microgrid and the main grid based, at least in part, on the one or more electrical parameters. The method includes generating a synchronization signal based on the one or more electrical parameters for the main grid and/or the microgrid in response to detection of the one or more predefined conditions. The synchronization signal includes at least a voltage reference to be maintained at a microgrid bus to synchronize the microgrid with the main grid. The microgrid bus is a bus through which the plurality of microgrid inverters are connected. Furthermore, the method includes transmitting the synchronization signal to the plurality of microgrid inverters to adjust respective output electrical parameters. The respective output electrical parameters are adjusted by each of the plurality of microgrid inverters to match voltage at the microgrid bus with the voltage reference comprised in the synchronization signal. The control of the voltage at the microgrid bus corresponding to the voltage reference facilitates synchronization of the microgrid inverters in the microgrid.

In another embodiment, a system is disclosed that includes a master inverter and a microgrid. The master inverter is operatively connected to a main grid and a plurality of microgrid inverters of the microgrid. The master inverter is configured to monitor the main grid and the microgrid to determine one or more electrical parameters for the main grid and the microgrid. The master inverter is further configured to detect one or more predefined conditions related to a fault that occurred in at least one of the microgrid and the main grid based, at least in part, on the one or more electrical parameters. In response to detection of the one or more predefined conditions, the master inverter is configured to generate a synchronization signal based on the one or more electrical parameters for the main grid and/or the microgrid in response to detection of the one or more predefined conditions. The synchronization signal includes at least a voltage reference to be maintained at a microgrid bus to synchronize the microgrid inverters. The microgrid bus is a bus through which the plurality of microgrid inverters are connected. The master inverter is further configured to transmit the synchronization signal to the plurality of microgrid inverters to adjust respective output electrical parameters of the plurality of microgrid inverters. The respective output electrical parameters are adjusted by each of the plurality of microgrid inverters to match voltage at the microgrid bus with the voltage reference comprised in the synchronization signal. The control of the voltage at the microgrid bus corresponding to the voltage reference facilitates the synchronization of the microgrid with the main grid.

Synchronizing microgrids with the main grid is a crucial step toward achieving a more resilient and efficient energy infrastructure. It enables microgrids to function both as independent energy sources and as valuable contributors to the overall grid stability. As the world transitions towards cleaner and more distributed energy systems, the synchronization of microgrids will play a pivotal role in shaping the future of energy management and sustainability. By following the key steps outlined as proposed in the present disclosure, the full potential of microgrids can be harnessed for a more reliable and sustainable energy future.

Various embodiments of the present disclosure offer multiple advantages and technical effects. For instance, the present disclosure provides the systems and methods for synchronizing the microgrid inverters and synchronizing the microgrid with the main grid, when a fault has occurred in either the microgrid or the main grid while reducing the mismatch of the power flow exported by the microgrid inverters in the microgrid. In particular, the proposed system generated a synchronization signal to be sent to the microgrid inverters to achieve the synchronization of the microgrid inverters. Moreover, the present invention introduces a phase droop control technique to reduce mismatch between power delivered by each inverter/each electrical source. By implementing the phase droop control technique, the phase angle of the electrical source is corrected to nullify the power mismatch between the power delivered by the microgrid inverters and electrical sources. In other words, with the proposed system, the frequency and voltage of the microgrid are maintained within the tolerance limits of the connected loads/breakers such that the loads do not encounter grid voltage trips.

BRIEF DESCRIPTION OF THE FIGURES

For a more complete understanding of example embodiments of the present technology, reference is now made to the following descriptions taken in connection with the accompanying drawings in which.

Figure 1:
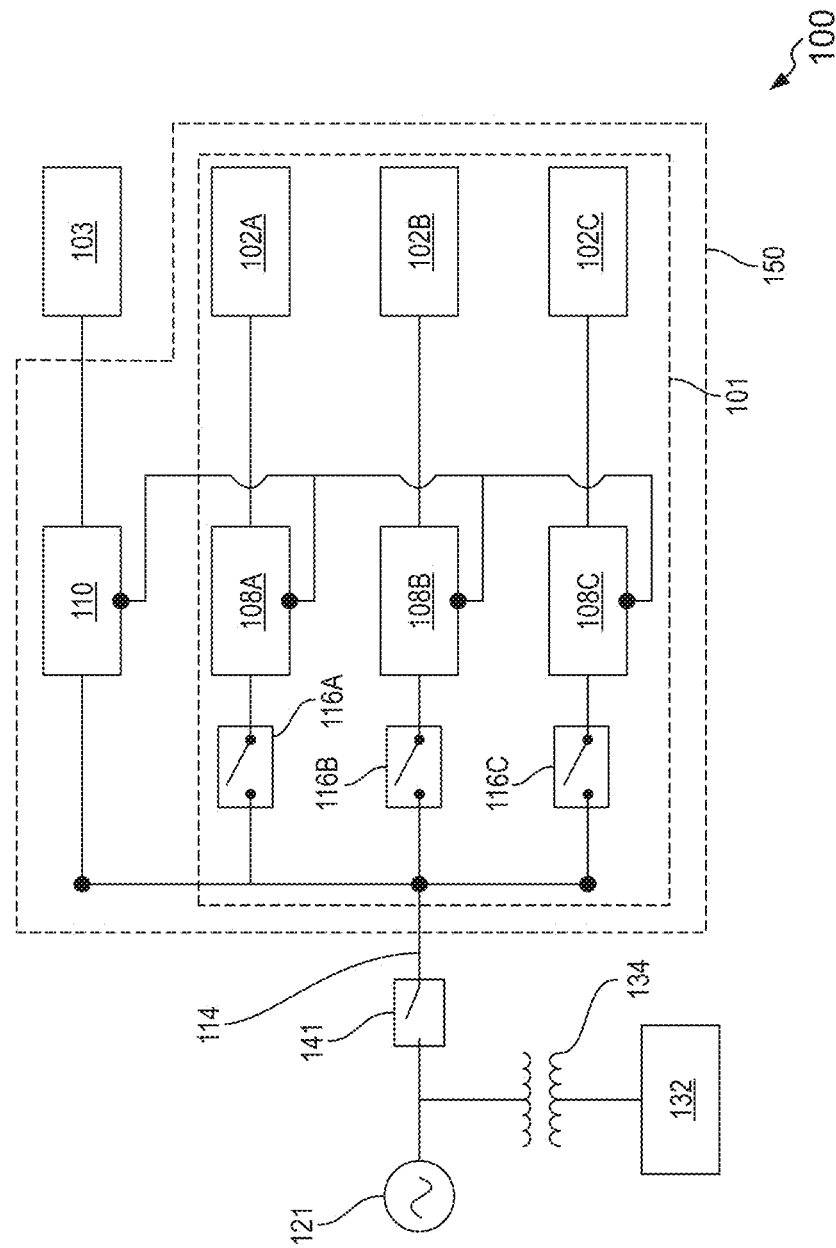
FIG. 1 is an example representation of an environment related to at least some examples of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification is not necessarily referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The terms "grid", "public grid", "electrical grid", "main grid", "power grid", and "utility grid" may be used interchangeably throughout the description, and they refer to an interconnected network of one or more components for electricity delivery from producers such as power stations to consumer loads.

The term "microgrid" refers to a local electrical grid with defined boundaries, acting as a single and controllable entity that is usually attached to a main grid but is also able to function independently.

The term "inverter source" refers to a combination of an inverter and a corresponding electrical source connected to the inverter in the grid or the microgrid.

The terms "grid-following mode", "grid-tie mode", "current-controlled mode", and "current source mode" may have been used interchangeably throughout the description. Unless the context suggests otherwise, these terms refer to a mode of operation of an inverter in a power conversion unit receiving power from a distributed energy source (e.g., a fuel cell), in which the inverter tracks a voltage angle of the grid or the microgrid via an inverter controller to control an output (synchronizing to the grid or the microgrid) of the inverter.

The terms "grid-forming mode", "island mode", "voltage-controlled mode", and "voltage source mode" may have been used interchangeably throughout the description. Unless the context suggests otherwise, these terms refer to a mode of operation of an inverter in a power conversion unit receiving power from a distributed energy source (e.g., a fuel cell), in which the inverter actively controls the frequency and voltage output of the inverter independent of the grid via an inverter controller.

The term "grid-forming inverter" refers to a combination of a power conversion unit and the corresponding connected source, when actively controlling the frequency and voltage output independent of the main grid.

The term "Droop control" refers to a mechanism of regulating voltage and frequency by inherently regulating reactive power and active power which can be sensed locally, based on certain Alternating Current (AC) Droop curves. The Droop control may not require communication between the inverter controllers.

The term "power conversion unit" refers to an electrical circuit that changes the electric energy from one form to another into a desired form optimized for a specific load.

The term "inverter" refers to an electronic device that changes Direct Current (DC) to Alternating Current (AC).

The term "inverter controller" refers to a controller that controls an operation of the inverter for regulating an output of the inverter to match certain conditions using feedback from the output of the inverter.

The terms "fuel cell system" and "fuel cell" may be used interchangeably throughout the description, and they refer to systems or electrochemical cells that convert the chemical energy of a fuel (often hydrogen) and an oxidizing agent (often oxygen) into electricity through a pair of redox reactions.

The terms "load", "electric load", and "consumer load" may be used interchangeably throughout the description, and they refer to any component of a circuit that consumes power or energy.

The term "synchronization" when referring to a microgrid and a main grid refers to a process in which at least one electrical parameter, such as voltage, frequency, or phase, matches across two electrical points in a bus, where one terminal is connected to the main grid and the other terminal of the bus is connected to the microgrid. Further, the terms "synchronization of inverter sources", "synchronization of inverters", and "synchronization of microgrid inverters" may be interchangeably used throughout the description and they refer to synchronization among the outputs of the microgrid inverters in the microgrid.

The term "switch" may refer to a switching device capable of closing, carrying, and breaking the current under normal and abnormal circuit conditions within a specified time.

Overview

Various example embodiments of the present disclosure provide systems and methods for synchronization among the microgrid inverters and synchronization between the microgrid and the main grid in a micro-grid based site. The microgrid-based site includes an electric network of a main grid and one or more microgrids connected to the main grid through an AC bus comprising a microgrid bus (interchangeably referred to as "microgrid AC bus") and a main grid bus. The segment of the AC bus connected to the microgrid is referred to as a microgrid AC bus, whereas the segment of the AC bus connected to the main grid is referred to as a main grid bus. Each microgrid can be operated in a grid-tie mode or an island mode. The microgrid also includes multiple power conversion units connected in parallel and delivering alternating current (AC) power. In the microgrid, all the power conversion units are connected to a microgrid bus. Each power conversion unit may include power electronic devices such as inverters. In the case of a DC source, the power conversion unit may also include an inverter (also referred to as "microgrid inverter") to convert DC power to AC power. Thus, the microgrid inverters with DC sources are connected to the microgrid bus, and deliver the AC power through the microgrid bus. In other words, all the DC power sources such as solid oxide fuel cell systems (SOFC), solar power systems, wind power systems, etc., are connected to the microgrid bus through the corresponding microgrid inverters and deliver AC power to loads. Each microgrid inverter is controlled by an inverter controller. In an example, the inverter controller may generate a control signal with the required duty cycle and frequency to achieve the desired electrical parameters such as voltage, current, frequency, phase angle, and so on.

Further, the inverters in the power conversion units may be operated as voltage source inverters to form grid-forming inverters or current source inverters to form grid-following inverters. When one or more predefined conditions related to fault occurrence in the micro-grid based site are detected, such as short circuit faults, loss of synchronization, etc., the electrical connection at the microgrid bus may be interrupted to isolate the microgrid from the main grid. The one or more predefined conditions may include but are not limited to, a deviation of frequency outside the predetermined range, exceeding the current in the bus from the predetermined threshold, and so on. In such cases, the electrical parameters of the microgrid deviate from the electrical parameters of the main grid.

In order to synchronize the electrical parameters among the microgrid inverters, to synchronize the electrical parameters of the microgrid with the electrical parameters of the main grid, and to reestablish the stable connection of the micro-grid with the main grid, a master inverter is introduced. The master inverter is connected to the microgrid inverters to control the output of the microgrid inverters. The master inverter is not in connection with the microgrid bus and acts as a control element of the system to control the one or more operations of the inverter controllers of the microgrid inverters.

The master inverter acts in voltage source mode to synchronize the micro-grid inverters where the microgrid inverters switch between current source mode (grid-following) and voltage source (grid-forming) modes based on the connectivity of the microgrid with the main grid. The master inverter may be associated with a lower rating as compared to microgrid inverters in the microgrid as the master inverter is not connected to a load. Also, the master inverter can be configured as either a single phase inverter or a three phase inverter depending on the nature of phase locked loop (PLL) e.g. zero crossing PLL used in microgrid inverters.

Each of the microgrid inverters includes one or more inverter controllers configured to control one or more electrical parameters of the associated microgrid inverter. An inverter controller may be implemented by, for example, hardware, firmware, processor, circuitry, and/or a computing device associated with the execution of software that includes one or more computer program instructions. In an example based on one or more control signals (e.g., asynchronization signal received at the inverter controller), the inverter controller may be configured to generate a pulse width modulation (PWM) signal with an appropriate duty cycle and frequency to change the electrical parameters such as voltage magnitude, phase angle, current magnitude, etc. The shape of the waveform of the control signal generated by the inverter controller can have shapes such as sinusoidal, triangular, and so on.

The master inverter acts as a voltage source inverter and continuously operates in grid-forming mode. The voltage thus generated by the master inverter is fed as a synchronization signal to the microgrid inverters. The master inverter continuously monitors one or more electrical parameters such as voltages, phase, current, etc. at the microgrid bus. In an example, the system comprises one or more sensors electrically coupled to the microgrid bus and the main grid to sense data corresponding to the one or more electrical parameters at the main grid as well as at the microgrid bus. The sensed data from the sensor(s) are received at the master inverter where the master inverter determines the electrical parameters at the main grid and the microgrid bus. Upon determination of the electrical parameters, the master inverter detects whether there is a fault in either the microgrid or the main grid. In an example, the master inverter monitors the electrical parameters of the main grid and the microgrid and then checks whether any of the electrical parameters of the main grid exceed a predetermined threshold. Until the parameters of the main grid are within the predetermined threshold values, the voltage generated by the master inverter is maintained in synchronism with all the microgrid inverters so that all the microgrid inverters are synchronized with each other. Further, the voltage generated by the master inverter also helps in the synchronization of the microgrid inverters with the main grid. If any of the electrical parameters exceed a predetermined threshold, a fault is considered to be detected in the site. In such cases, a need for isolating and resynchronizing the microgrid bus from the main grid arises.

When a fault is detected, the voltage included in the synchronization signal generated by the master inverter is controlled based on a set of predefined electrical parameters such as voltage, frequency, phase, etc., thereby regulating the microgrid AC bus in a stable operating region. This generated voltage acts as a synchronization signal which is used as a reference by the microgrid inverters to regulate the microgrid AC bus voltage. The generated voltage (either single phase or 3 phase) which acts as a synchronization signal is transmitted to all the microgrid inverters connected in a microgrid.

Under main grid fault scenarios, the master inverter or a third-party controller may transmit a control signal (also referred to as "tie breaker control signal") to a tie breaker connected between the main grid and the microgrid. The tie breaker moves between a closed position in which the microgrid is connected to the main grid and an opened position in which the microgrid is disconnected from the main grid. Upon detection of the fault in either the microgrid or the main grid, the tie breaker may be configured to move from the closed position to the opened position to isolate the microgrid and the main grid to minimize the impact of the fault in the overall power distribution system. The transmission of the control signal facilitates the tie breaker to move between the closed position and the opened position to connect/disconnect the microgrid with the main grid.

As the voltage generated by all the microgrid inverters/electrical sources are in synchronization with a fixed voltage reference as generated by the master inverter, the power flow between the connected microgrid inverters only depends on their respective impedances and a small error in phase angle generated by sensing circuitry or the phase locked loops employed by the inverter voltage controllers. If all the electrical sources connected in the microgrid have the same or similar source impedances and similar inverters used for all the electrical sources in the microgrid, then the power sharing between the inverters is dependent on the phase differences between output generated by the microgrid inverters. The minor power sharing differences between the sources can be compensated using proposed phase droop control technique by providing a negative offset in the phase angle.

FIG. 1 is an example representation of an environment 100 related to at least some examples of the present disclosure. Although the environment 100 is presented in one arrangement, other embodiments may include the parts of the environment 100 (or other parts) arranged differently depending on, for example, a system for synchronizing microgrid inverters of a microgrid with each other. Additionally, the system may also be configured to synchronize the microgrid inverters of the microgrid with a main grid in a site. As depicted in FIG. 1, system 150 may include a master inverter 110 and a microgrid 101. The example representation of the environment 100 as depicted in FIG. 1, corresponds to the microgrid-based site (also referred to as a "site") including a main grid and a microgrid or an electrical network of one or more microgrids. The microgrid-based site may operate in a grid-tie mode or an islanded mode. In the grid-tie mode, frequency and voltage regulation is handled by the main grid. However, in the islanded mode, the microgrid may be able to regulate internal frequency and voltage with proper control. The environment 100 depicts a master electrical source 103, and a microgrid 101 that includes one or more electrical sources such as electrical sources 102A, 102B, and 102C (collectively referred to as electrical source 102).

For instance, each of the electrical sources 102A, 102B, 102C, and 103 may include DC energy generators such as solar panels, wind turbines, or fuel cells such as solid oxide fuel cells. The term "solid oxide fuel cell" refers to a fuel cell system that has a solid oxide or a ceramic electrolyte and produces electricity. Further, the electrical sources 102A, 102B, 102C, and 103 may comprise a single fuel cell or a fuel cell system containing dozens, hundreds, or thousands of individual fuel cells. Each fuel cell generates power of a predefined capacity, and by stacking a plurality of fuel cells with each other and/or connecting them in series, more power can be obtained. Further, for example, the collective amount of energy generated by the electrical sources 102A, 102B, or 102C in the site may correspond to the predefined power rating of the microgrid. The master electrical source 103 is used for controlling the voltage at the microgrid AC bus 114 and is not connected to any electric load in any case. The master electrical source may act as a power source for the master inverter 110.

If the energy generated by the electrical sources 102A-102C is Direct Current (DC), one or more power conversion units such as power conversion units 108A, 108B, and 108C (collectively referred to as power conversion units 108) are connected to each of the electrical sources 102A-102C respectively.

Each of the power conversion units 108A-108C can be connected to one or more load buffer modules (not shown in FIG. 1) respectively. The load buffer modules may be used for storing excess energy generated by the electrical sources 102A, 102B, and 102C. For instance, the load buffer modules could comprise a battery.

Moreover, each of the power conversion units 108A-108C is controlled on a single microgrid AC bus 114. The power conversion units 108A-108C are connected to the microgrid AC bus 114 through switches 116A, 116B, and 116C. Further, the microgrid AC bus 114 supplies power to a load 132 through a transformer 134. The AC bus 114 connects the microgrid 101 to the main grid 121.

Each of the power conversion units 108A-108C may include an inverter (not shown in FIG. 1) including an inverter controller. The inverter may be operating as a voltage source inverter (grid-forming inverter) or as a current source inverter (grid-following inverter) based on the site control architecture implemented on the site. Further, each inverter controller may control the output of the inverter based on the type and operation of the inverter. Each inverter along with each inverter controller within each of the power conversion units 108A, 108B, and 108C enables the power conversion units 108A-108C to convert the energy from DC to Alternating Current (AC). The load 132 may include components that may need AC power for the proper functioning of the components at the site load. For instance, the load 132 may include industrial appliances if the site may be an industry, home appliances if the site may be a society, educational and learning appliances if the site may be a college or an Information Technology (IT) organization, and the like.

The master electrical source 103 is connected to the master inverter 110. The master inverter 110 converts DC power received from the master electrical source 103 to AC power. The master controller of the master inverter is connected to each of the inverter controllers of power conversion unit 108A-108C.

The environment 100 also depicts a tie breaker 141 selectively connected between the microgrid 101 and the main grid 121 and configured to connect or disconnect the microgrid 101 with the main grid 121. One end of the tie breaker 141 is connected to the main grid 121 and the other end of the tie breaker 141 is connected to the microgrid AC bus 114. During the fault conditions, the tie breaker 141 may disconnect the microgrid 101 from the main grid 121, and upon fault clearance and synchronization between the microgrid 101 and the main grid 121, the tie breaker 141 may connect the microgrid 101 with the main grid 121.

The master inverter 110 is connected to a set of electrical points at the microgrid bus 114 and main grid 121, where each of the set of electrical points may be equipped with one or more electrical sensors. For example, the one or more electrical sensors may include a current sensor, a voltage sensor, a power sensor, and the like. Through the one or more electrical sensors, the master controller may be configured to sense the one or more electrical parameters such as but not limited to current, voltage, phase angle, waveform, and phase sequence at microgrid bus 114 and the main grid separately. In other words, the master controller fetches the values corresponding to the one or more electrical parameters from the one or more electrical sensors.

The master controller is communicatively coupled to the one or more electrical sensors and one or more inverter controllers via a network (not shown in FIG. 1) such as a wireless or wired communication network. The network may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among certain entities illustrated in FIG. 1, or any combination thereof.

The master inverter 110 continuously monitors the electrical parameters of the main grid 121 and/or the microgrid 101 and determines the electrical parameters through sensed data received at the one or more electrical sensors. Upon determination of the electrical parameters, the master inverter 110 detects whether any fault event has occurred in either the microgrid 101 or the main grid 121. In an example, the master inverter detects whether any of the electrical parameters of the main grid 121 and/or the microgrid 101 exceed a predetermined threshold. If any of the electrical parameters exceed a predetermined threshold, one or more predefined conditions related to the fault that occurred in microgrid 101 or main grid121 are detected. The one or more predefined conditions may include, but are not limited to, deviation of frequency outside the predetermined range, exceeding the current in the bus from the predetermined threshold, and so on. Until the parameters of the main grid are within the predetermined threshold values, the voltage generated by the master inverter is maintained in synchronism with all the microgrid inverters so that all the microgrid inverters are synchronized with each other. Further, the voltage generated by the master inverter also helps in the synchronization of the microgrid inverters with the main grid. If any of the electrical parameters exceed a predetermined threshold, a fault is detected in the main grid. In such cases, a need for isolating and resynchronizing the microgrid bus from the main grid arises.

When the predefined conditions related to the fault are detected, the master inverter 110 generates a synchronization signal that includes a voltage based on a set of the predefined electrical parameters such as voltage, frequency, phase, etc. This generated voltage acts as a synchronization signal which is used as a reference by the microgrid inverters to regulate the microgrid AC bus voltage. The voltage reference may be either single phase or 3-phase voltage, which acts as a synchronization signal for all the microgrid inverters connected in microgrid 101.

The synchronization signal is transmitted to all the microgrid inverters through a network. Each microgrid inverter follows the voltage reference as included in the synchronization signal to regulate the microgrid AC bus in a stable operating region. The master controller may be connected to the inverter controller of the microgrid inverters through a wired connection or a wireless connection. The network may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among the master controller and the inverter controller illustrated in FIG. 1. As a result of the transmission of the synchronization signal, the voltage generated by the individual inverters are adjusted to match the voltage of the microgrid bus 114 corresponding to the voltage generated by the master inverter 110, causing synchronization among the microgrid inverters. Further, the voltage reference as included in the synchronization signal may correspond to a voltage of the main grid bus to be connected with the microgrid bus. In such cases, matching the voltage of the microgrid bus 114 with the voltage generated by the master inverter 110 causes synchronization of the microgrid bus 114 with the main grid 121.

Upon synchronization of the microgrid 101 with the main grid 121, the master inverter 110 or a third-party controller may transmit a control signal (also referred to as "tie breaker control signal") to a tie breaker 141 connected between the main grid and the microgrid. Upon receipt of the control signal, the tie breaker 141 may be configured to move into the closed position. The transmission of the control signal facilitates the tie breaker to move into the closed position to establish the connection between the microgrid and the main grid. All the functions as mentioned above are performed by the master controller as a part of the master inverter 110. Further, the operation of the master inverter is explained in detail in further parts of the description of the subsequent figures.

It should be noted that the power conversion units, electrical load, the inverter controllers, the electrical sources, transformers, the switches, the transformers, the AC bus, and the third-party sources described herein are only used for exemplary purposes and do not limit the scope of the invention. The main objective of the invention is to establish synchronization among the microgrid inverters and synchronization of the microgrid inverters with the main grid. This is facilitated by enabling the master inverter 110 to generate the synchronization signal and transmit it to each of the inverter controllers. As a result, the inverter controller of each microgrid inverter would be able to generate the voltage such that the outputs of the microgrid inverters are synchronized with each other and the voltage of the microgrid AC bus is synchronized with the main grid.

Figure 2:
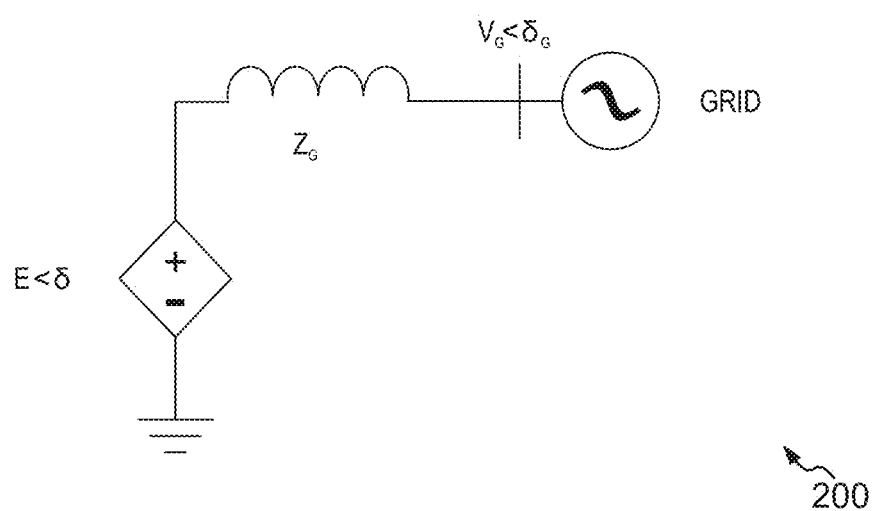
FIG. 2 is a circuit diagram representation of a grid-forming inverter in a microgrid, in accordance with an embodiment of the present disclosure.

FIG. 2 is a circuit diagram representation of a grid forming inverter 200 in a microgrid, in accordance with an embodiment of the present disclosure. Such multiple grid-forming inverters may form a grid or islanded grid in which a voltage source is connected to the main grid or the load through an impedance. The impedance $Z_g$ herein can be a grid impedance, a source impedance, or combined impedance of the grid and the source.

As shown in FIG. 2, E<δ represents inverter voltage vector at the output of the inverter, $V_g<\delta_g$ represents grid voltage vector. The active and reactive power flows are given by the following power swing equations:

$$P = \frac{E}{Z_g}(E\cos\theta - V_g\cos(\theta + \delta - \delta_g)) \quad (1)$$

$$Q = \frac{V_g}{Z_g}(E\sin(\theta + \delta - \delta_g) - V_g\sin\theta) \quad (2)$$

Where E, $V_g$: voltage magnitudes of inverter source and grid, respectively;
$Z_g$: magnitude of the impedance;
θ: phase angle of the impedance; and
$\delta-\delta_g$: phase angle difference between electrical sources connected in the microgrid.

Figure 3:
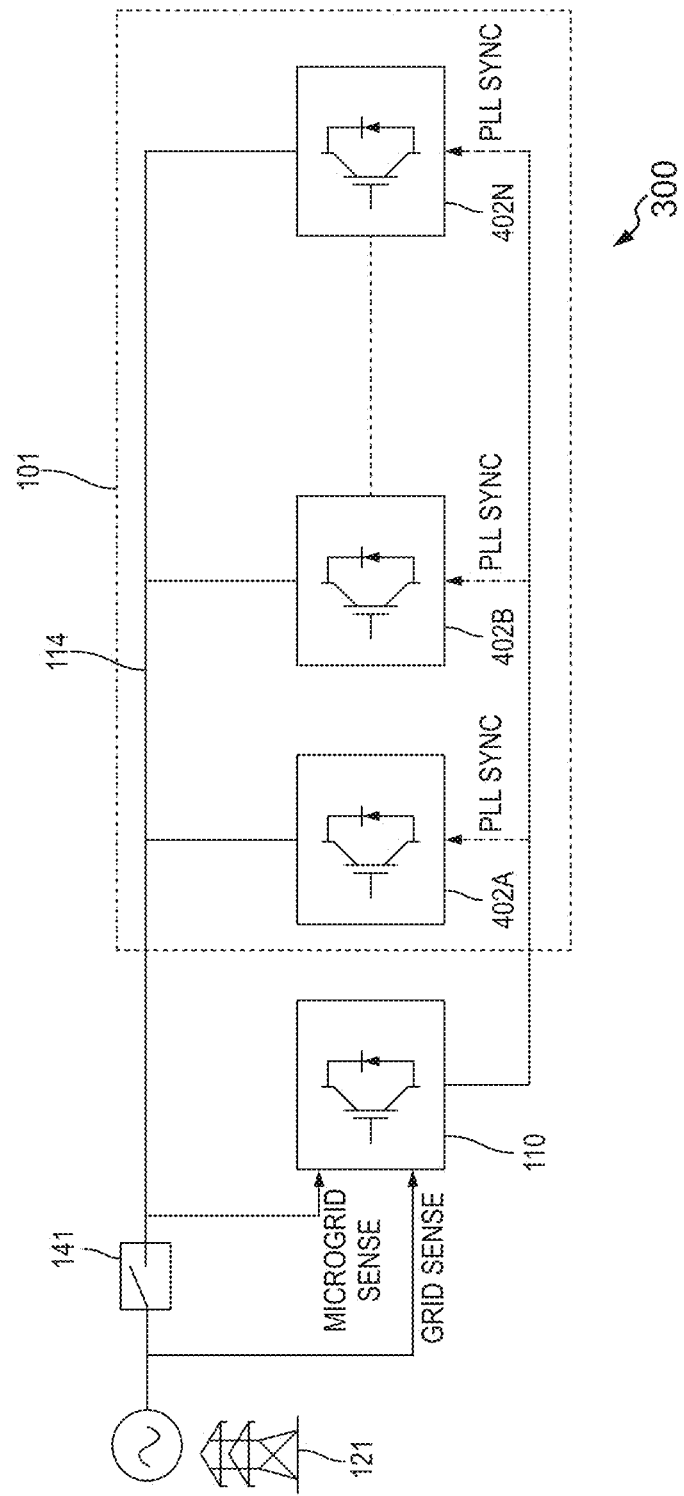
FIG. 3 is a single line diagram (SLD) representation of a proposed control scheme for synchronizing microgrid inverters with each other and with a main grid, in accordance with an embodiment of the present disclosure.

FIG. 3 is a single line diagram (SLD) representation of the proposed control scheme for synchronizing microgrid inverters with each other and with a main grid121, in accordance with an embodiment of the present disclosure.

As mentioned earlier, the microgrid 101 includes a plurality of microgrid inverters 402A, 402B . . . 402N (individually referred to as microgrid inverter 402 and collectively referred to as microgrid inverters 402). Each of the plurality of microgrid inverters 402 is connected to a corresponding electrical source (not shown in FIG. 3) through an electrical connection. Each pair of the inverter and corresponding connected source is referred to as an inverter source. The electrical source may be a DC electrical source configured to supply DC power to the corresponding connected microgrid inverter 402. The microgrid inverter is configured to convert the DC power into AC power and to supply the AC power through the microgrid bus 114. The microgrid 101 is connected to the main grid 121 through a tie breaker 141. The tie breaker 141 is configured to connect or disconnect the microgrid 101 with the main grid 121. As mentioned earlier, the tie breaker 141 is configured to move between a closed position and an opened position. The closed position of the tie breaker 141 refers to a position in which microgrid 101 is connected with the main grid 121, whereas the opened position of the tie breaker 141 refers to a position in which the microgrid 101 is disconnected from the main grid 121. The tie breaker 141 is an electrical relay that allows buses to connect together or allows buses to separate from each other depending on conditions. If a fault occurs in microgrid 101 or main grid 121, the tie breaker 141 may be configured to move in an opened position so as to maintain the electrical parameters within the predetermined range such as to limit the flow of inrush current. Upon synchronizing at least one of voltage, frequency, and phase, the microgrid 101 is synchronized with the main grid 121, and then the tie breaker 141 may be configured to move into the closed position to connect the microgrid 101 with the main grid 121.

To synchronize microgrid inverters 402 in the microgrid, a master inverter 110 is operatively connected between the main grid 121 and the microgrid 101. In particular, the master inverter 110 is connected to the main grid 121 and the microgrid 101 through one or more electrical sensors such as but not limited to voltage sensors, phasor measurement units, phase angle meters, etc. The one or more electrical sensors may also be employed at both terminals of the tie breaker.

The master inverter 110 includes a master controller that receives the one or more electrical parameters measured at the connection points of the AC bus that are connected to the main grid 121 and the microgrid. In particular, the master inverter 110 receives the electrical parameters related to the microgrid from the connection points at the microgrid bus and receives the electrical parameters related to the main grid from the connection points at the main grid bus. The one or more electrical parameters are determined at the one or more connection points of the AC bus where the electrical sensors are employed. In particular, to determine the one or more electrical parameters, the master inverter 110 may be configured to receive sensing signals from the one or more sensors and analyze them to determine the electrical parameters at the connection points at the AC bus. In particular, the master controller analyzes the received one or more electrical parameters and determines whether a fault has occurred in microgrid 101 and/or main grid 121. In an illustrative scenario, if the one or more electrical parameters surpass a predetermined threshold, it is considered that a fault has occurred. Under fault conditions, the tie breaker 141 may be configured to move in the opened position causing an interruption of power flow between the microgrid 101 and the main grid 121.

The main grid parameters are generally assumed to be constant or vary with minor variations, therefore the electrical parameters at the microgrid 101 are adjusted to establish synchronization between the microgrid 101 and the main grid 121. The master inverter 110 may generate a synchronization signal and transmit the signal to the microgrid inverters of the microgrid 101. The synchronization signal may include a voltage reference to which the voltage of the microgrid bus is synchronized. In particular, each microgrid inverter follows the voltage reference as included in the synchronization signal to generate a common bus voltage at the microgrid bus. Following the voltage reference by each microgrid inverter helps in achieving the synchronism among the microgrid inverters. When such voltage reference also corresponds to the voltage of main grid bus, then following the voltage reference by each microgrid inverter also helps in achieving the synchronism between the microgrid bus and the main grid bus.

In addition, the synchronization signal may also include phase reference and frequency reference to which the microgrid bus is synchronized. The synchronization signal may be of a single-phase or 3-phase signal. The synchronization signal can be triangular, rectangular, etc. The synchronization signal acts as a control signal for the inverter controllers of the microgrid inverters 402. As a result, the desired output at each of the microgrid inverters 402 and at the microgrid bus 114 is achieved, thereby establishing the synchronization among the microgrid inverters 402 and synchronization between the microgrid 101 and the main grid 121.

In one implementation, the synchronization signal may be continuously generated until the fault is cleared and once the fault is cleared, the generated synchronization signal may be used to resynchronize the microgrid 101 with the main grid 121 to ensure their stable operation. More particularly, once the fault is rectified or the faulty equipment is repaired or replaced, the generated synchronization signal is transmitted to the inverters 402 for resynchronization of the microgrid 101 with the main grid 121.

Upon resynchronizing after the fault, the tie breaker 141 is configured to move from the opened position to the closed position. In one implementation, tie breaker 141 is employed with a set of electrical sensors to measure the electrical parameters at the connection points of the tie breaker 141, and if the electrical parameters are synchronized at both ends of the tie breaker, the tie breaker 141 moves to the closed position. The movement of the tie breaker 141 allows the flow of current and power between the microgrid 101 and the main grid 121. The set of electrical sensors employed with the tie breaker 141 may be the same or different from electrical sensors employed with master inverter 110.

Figure 4:
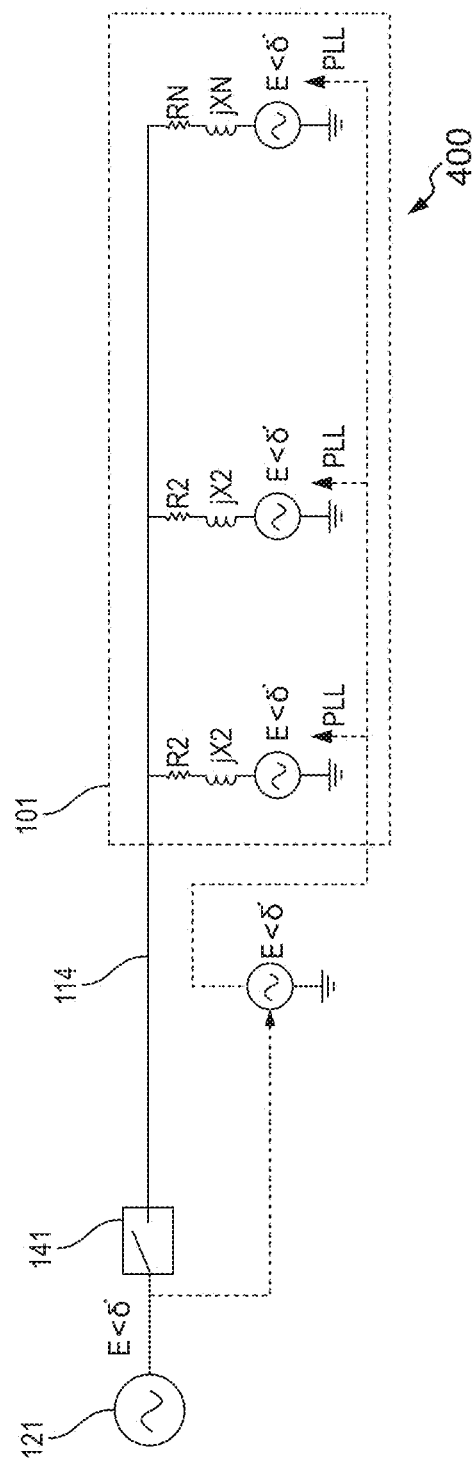
FIG. 4 is a circuit diagram representation of the proposed control scheme for synchronizing microgrid inverters with each other and with a main grid, in accordance with an embodiment of the present disclosure.

FIG. 4 is a circuit diagram representation of the proposed control scheme for synchronizing microgrid inverters with each other and with a main grid 121, in accordance with an embodiment of the present disclosure. As mentioned earlier, the synchronization signal includes a voltage reference to which the voltage of the microgrid bus is synchronized.

As the voltage generated by all the microgrid inverters/electrical sources are in synchronization with a fixed voltage reference as generated by the master inverter, the power flow between the connected microgrid inverters only depends on their respective impedances and a small error in phase angle generated by sensing circuitry or the phase locked loops employed by the inverter voltage controllers. The error in phase angle and impedance mismatch causes the circulating power to flow among the microgrid inverters 402A-402N of the microgrid. The corresponding power flow between the connected sources or microgrid inverters 402A-402N depends on at least one of their respective impedances, the minor errors in phase generated by sensing circuits, or the phase locked loops employed by the inverter voltage controllers. If all the electrical sources/inverters connected in the microgrid 101 have the same/similarly matched source impedances, then the sharing of power among the inverters is essentially assured, with the exception of minor variations in phase between them.

The power delivered by each of the electrical sources in the microgrid 101 follows the above-mentioned equations (1) and (2) as each of the electrical sources along with the connected inverter acts as a grid-forming inverter. The impedance of individual sources can be matched at the implementation stage or design level, so that the power delivered by each electrical source can be matched, thereby matching the power sharing between them. As the voltage output at the inverter E, the phase angle of the inverter $\delta$ and $Z_g$ impedance of the inverter or sources or the combined impedance of source and inverter are matched for all the microgrid inverters in the microgrid 101 and grid voltage vector $V_g < \delta_g$ is constant, the power between different sources can be uniformly matched.

In one implementation, if each of the electrical sources, inverters, and associated impedance are identical in the microgrid 101, there is still a possibility that there is a power mismatch between the microgrid inverters in the microgrid 101. This power mismatch is induced by the generation of errors/delays in the phase-locked loop (PLL) and the mismatch of source impedance $Z_n$ due to the transmission line impedances and the associated mismatches in the transformer impedances, etc. in the site layout. In particular, when an electrical source is connected to the load through a line connection, the effective source impedance would be the combination of the original source impedance and the line impedance, whereas the line impedance for each electrical source may depend on the location of the corresponding source in the microgrid bus. Therefore, when the one or more electrical sources are connected through the line connection, the effective source impedance would be different for each of the electrical sources in the microgrid 101.

The active power and reactive export by the individual inverter source are given as $$P_n = \frac{E_n}{Z_n}(E_n \cos\theta_n - V_g \cos(\theta_n + \delta_g)) \qquad (3)$$

$$Q_n = \frac{V_g}{Z_n}(E_n \sin(\theta_n + \delta_n - \delta_g) - V_g \sin\theta_n) \qquad (4)$$

where $P_n$, $Q_n$: Active and reactive power delivered by Nth microgrid inverter source in the microgrid 101 respectively.

$E_n$, $\delta_n$: Voltage magnitude and phase of voltage generated by Nth inverter source in the microgrid 101, respectively.

$V_g$, $\delta_g$: Voltage magnitude and phase of microgrid bus voltage, respectively.

$Z_n$, $\theta_n$: Magnitude and phase angle of source impedance of Nth inverter source, respectively.

For identical inverters and similar electrical sources, the values $E_n$, $\delta_n$ and $Z_n$, $\theta_n$ would remain identical except for minor differences in phase ($\delta_n$) generation caused by errors/delays in PLL and the mismatch of source impedance $Z_n$ caused by the connecting line impedances. In other words, the mismatches in phase angle and source impedances between different inverter sources could cause power mismatch between different inverter sources which is undesirable. A mismatch of $\Delta\delta$ in phase and $\Delta Z$ in impedance in any one of the connected sources would result in the corresponding power delivered to the microgrid P-$\Delta$P given as $$P_l - \Delta P = \frac{E_n * V_g}{Z_n + \Delta Z} \sin(\delta_l - \Delta\delta) \qquad (5)$$

Where, $\delta_l$ is the power angle corresponding to load $P_l$. $P_l$ is the expected power sharing per inverter assuming identical inverters with no phase/impedance mismatches and can be given as $$P_l = \frac{E_n * V_g}{Z_n} * \delta_l.$$

$\Delta$P is a mismatch of the power delivered between the electrical sources in the microgrid 101, the mismatch caused due to phase angle mismatch $\Delta\delta$ and source impedance mismatch $\Delta Z$.

Now, for small values of ($\delta_l$-$\Delta\delta$) equation (6) can be approximated as $$P_l - \Delta P = \frac{E_n * V_g}{Z_n + \Delta Z} * (\delta_l - \Delta\delta) \qquad (6)$$

Equation 6 can be expanded using Taylor's series expansion as (neglecting higher order exponentials of $$\frac{\Delta Z}{Z_n}$$

as it is <<1).

$$P_l - \Delta P = \frac{E_n * V_g}{Z_n} * \left(1 - \frac{\Delta Z}{Z_n}\right) * (\delta_l - \Delta\delta) \qquad (7)$$

$$P_l - \Delta P = \qquad (8)$$

$$\frac{E_n * V_g}{Z_n} * \delta_l - \frac{E_n * V_g}{Z_n} * \Delta\delta - \frac{E_n * V_g}{Z_n} * \delta_l * \frac{\Delta Z}{Z_n} + \frac{E_n * V_g}{Z_n} * \Delta\delta * \frac{\Delta Z}{Z_n}$$

Substituting $P_l = \frac{E_n * V_g}{Z_n} * \delta_l$ $$P_l - \Delta P = P_l - P_l * \frac{\Delta\delta}{\delta_l} - P_l * \frac{\Delta Z}{Z_n} + \underbrace{P_l * \frac{\Delta\delta}{\delta_l} * \frac{\Delta Z}{Z_n}}_{\text{Term 4}} \qquad (9)$$

When accounting for phase or impedance errors below 10%, Term 4 can be safely disregarded as it results in less than a 1% power mismatch. The power mismatch $\Delta$P will now be associated with two primary components that are mutually independent, as described in equation (10).

$$\Delta P = P_l * \frac{\Delta\delta}{\delta_l} + P_l * \frac{\Delta Z}{Z_n} \qquad (10)$$

| Power mismatch due to phase error | Power mismatch due to impedance error |

The phase and impedance errors independently contribute to power mismatch. In an example, the maximum load power angle for the proposed system is 10° for full load of 300 kW. The maximum PLL error for zero crossing detector (ZCD) PLL considering the voltage sensor delays and PLL errors can be 1° which corresponds to 10% error in phase angle. Further, considering a maximum 10% mismatch in impedance between different inverter sources, the maximum power mismatch between any two inverter sources can be accounted for up to 20%.

The above-mentioned power mismatch or difference in power delivered by each of the electrical sources can be compensated by implementing a phase droop control mechanism. The phase droop control mechanism provides a negative offset in order to compensate for the power mismatch between the microgrid inverters in the microgrid 101. Introduction of a phase droop control technique mitigates the discrepancies in power delivered by different electrical sources connected through the microgrid inverters. In the phase droop control mechanism, the phase of the connected source/inverter is lagged with respect to the no load phase angle and this phase lag can act as a correction factor. The phase droop control mechanism is selectively activated or deactivated through a droop control flag. When the phase droop control mechanism is required, the master controller may be configured to set the flag to true to activate the phase droop control mechanism.

Figure 5:
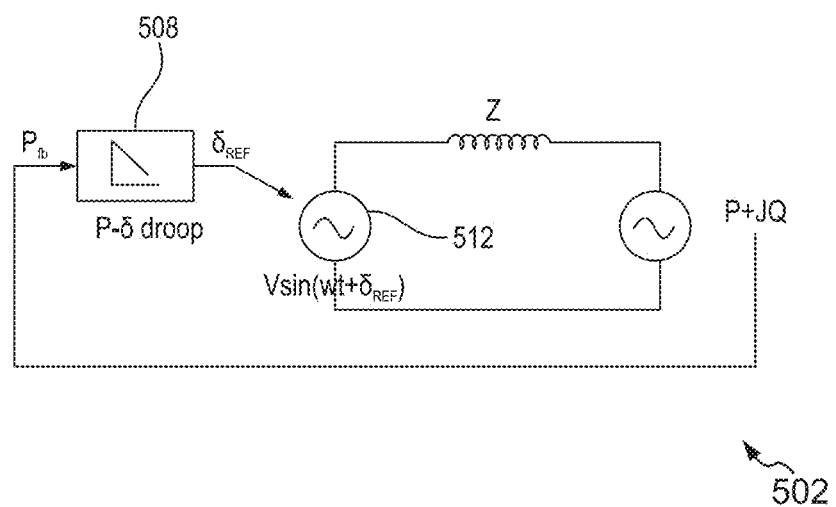
FIG. 5 is a detailed schematic of a control block diagram based on proposed droop control architecture, in accordance with an embodiment of the present disclosure.

The phase droop control technique can be implemented through the droop controller as illustrated in FIG. 5. The phase droop $\delta_{ref}$ and the corresponding voltage $V(P_l)$ generated by any inverter source operating in microgrid 101 as a function of its load export can be given as $$\delta_{ref} = \delta - m * P_l \quad (11)$$

$$V(P_l) = E < (\delta - m * P_l) \quad (12)$$

Where $E<\delta$ is the voltage reference given by the master inverter 110 so as to maintain at the AC bus voltage of the microgrid 101 as mentioned earlier and m is the slope of phase droop curve.

It can be noticed that equation (12) closely resembles the steady-state power flow equation of a voltage source with an inductive source impedance. Now, the power export by individual inverter considering the mismatches in impedance and phase angle can be given while substituting equation (11) in equation (5) as $$P_{inv} = \frac{E_n * V_g}{Z_n + \Delta Z} \sin(\delta_l - \Delta\delta - m * (P_l - \Delta P)) \quad (13)$$

Where $P_{inv}$ is the power export by each inverter considering the mismatch in the impedance and the phase angle between the microgrid inverters/electrical sources connected to the microgrid inverters.
Simplifying and rearranging equation (13) using Taylor's series expansion and neglecting higher order terms as used in equation (8), gives $$P_l - \Delta P_{new} = P_l - P_l * \frac{\Delta\delta}{\delta_l} - P_l * \frac{\Delta Z}{Z_n} + P_l * \frac{m * \Delta P}{\delta_l} \quad (14)$$

Where $\Delta P_{new}$ is the power mismatch after implementation of the phase droop control technique and $\Delta P$ is the power mismatch caused by phase angle and/or impedance mismatches between the sources as mentioned earlier without implementation of the phase droop control technique.

Further, simplifying the equation (14), the power mismatch as a result of implementation of the phase droop control can be given as $$\Delta P_{new} = P_l * \frac{\Delta\delta}{\delta_l} + P_l * \frac{\Delta Z}{Z_n} - P_l * \frac{m * \Delta P}{\delta_l} \quad (15)$$

Substituting equation (9) for $\Delta P$ in equation (15) gives $$\Delta P_{new} = \Delta P - P_l * \frac{m * \Delta P}{\delta_l} \quad (16)$$

As apparent from equation (16), the phase droop introduced in the voltage generated by the inverter reduces the power mismatch caused by phase/impedance mismatches. The power mismatch is reduced by the component $$P_l * \frac{m * \Delta P}{\delta_l}.$$

With the apropriate selection of m, the power mismatch can be completely nullified i.e., the power export by each of the microgrid inverters would be equal. 'm' is the droop coefficient or a slope of the droop curve as given by equation (11). The unit for 'm' is expressed as degrees per kilowatt (°/kW). By selecting a value of 'm' through matching the impedance characteristics of source, the power mismatch can be completely nullified.

To nullify the power mismatch, the droop slope $$m = \frac{\delta_l}{P_l} \quad (17)$$

Where $\delta_l$ is the load power angle corresponding to load power $P_l$.

$\Delta P_{new}=0$ i.e. the power mismatch can be completely nullified.

Thus, the droop slope implemented in an inverter is selected such that it matches with impedance characteristics of the corresponding inverter source to nullify the power mismatch i.e. match the power sharing between the paralleled inverter sources in the microgrid. In order to match the droop slope with the corresponding impedance characteristics, the impedance of the connected inverter source may not require to be perfectly matched with other parallel connected inverter sources as the phase droop is independently implemented within each inverter.

FIG. 5 is a detailed schematic of a control block diagram based on proposed droop control architecture, in accordance with an embodiment of the present disclosure. Each of the power conversion units 108A-108C includes an inverter controller such as an inverter droop controller 502. In another embodiment, the inverter droop controller 302 may be part of the inverter controller of the power conversion units. As shown in FIG. 5, an active power feedback ($P_{fb}$) is calculated within the inverter droop controller 502. Later, the active power feedback ($P_{fb}$) is passed through a phase-watt droop module 508 for generating a phase angle reference ($\delta_{ref}$) to provide a correction factor. Further, a fixed sinusoidal voltage reference signal is generated by passing the phase angle reference through a sine reference voltage generator module 512. The circuitry of the sine reference voltage generator module 512 includes an AC voltage source, an inductor, and a resistor. The generated fixed sinusoidal voltage reference signal is fed to the load, and the same is read and fed back to the inverter controller 502 as a feedback, and the process repeats. Thus, the inverter droop controller may correct the output voltage and phase angle of the microgrid inverter in the microgrid.

Figure 6:
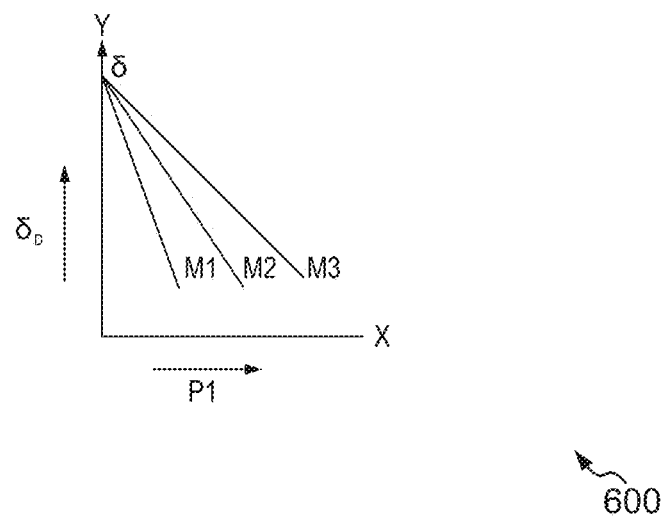
FIG. 6 is a graph diagram illustrating phase droop profiles for reducing the mismatch of the power export between the microgrid inverters in the microgrid in accordance with an embodiment of the present disclosure.

FIG. 6 is a graph diagram illustrating phase droop profiles for reducing the mismatch of the power export between the microgrid inverters in the microgrid in accordance with an embodiment of the present disclosure. FIG. 6 shows three different droop slope curves illustrating a phase droop profile. In an example, the droop curves are associated with the three different droop slopes $M_1$, $M_2$, and $M_3$ (collectively referred to as droop slope m). The droop slope is independent of the load. Since all the curves pass through a common point on the y-axis, these curves have one common characteristic. In particular, in each case, no load phase angle is the same. This phase angle also indicates the phase angle of source when the source impedance of each of the electrical sources connected in the microgrid is assumed to be identical.

In each case, the phase droop $\delta_{ref}$ decreases with the increase in the load export $P_l$. The rate of decrement in the phase droop $\delta_{ref}$ is dependent on the respective slope m. The slope m is dependent on the source characteristic such as source characteristic impedance of the electrical sources employed in the microgrid. Additionally, the slope m is also dependent on source characteristics such as a type of electrical source, source rating, etc. of the electrical sources employed in the microgrid. Therefore, the droop slopes $M_1$, $M_2$, and $M_3$ are associated with three different source characteristics, respectively. As described above, by selecting a particular value of the droop slope, the mismatch of the power export between the microgrid inverters can be nullified. Since the droop slope is dependent on the source characteristics, the appropriate electrical source characteristics should be selected such that the corresponding droop slope meets the criteria as indicated in the equation (16) in order to nullify the mismatch of the power export between the microgrid inverters. In other words, to nullify the difference between the power delivered by the at least two electrical sources, the droop coefficient for the electrical source is determined as a ratio of a load power angle ($\delta_l$) for an expected power delivered by a corresponding electrical source to the expected power ($P_l$) delivered by the corresponding electrical source.

Figure 7:
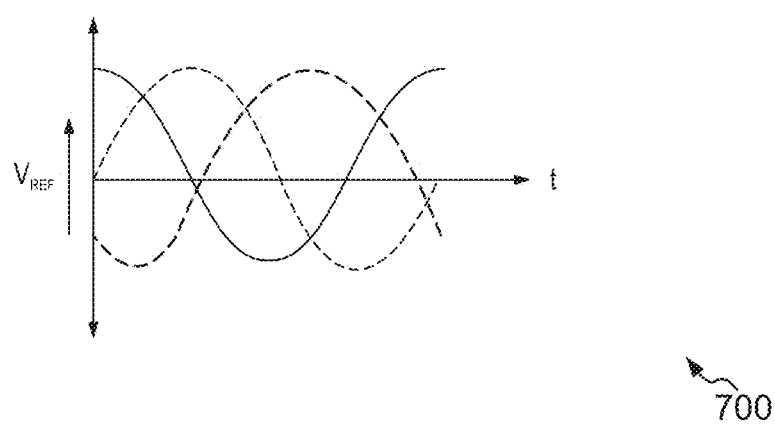
FIG. 7 is a graphical representation of the synchronization signal generated by the master inverter, in accordance with embodiments of the present invention.

FIG. 7 is a graphical representation of the synchronization signal generated by the master inverter, in accordance with embodiments of the present invention. As illustrated in FIG. 7, the synchronization signal 700 is represented by a three-phases inusoidal signal. As described above, based on the sensed electrical parameters at one or more connection points at the microgrid bus, the master inverter is configured to generate the synchronization signal 700 and transmit it to the microgrid inverters connected in the microgrid. The synchronization signal 700 includes at least a voltage reference to be maintained at a microgrid bus to synchronize the microgrid inverters with each other. The voltage reference may include at least one of voltage magnitude, phase, and frequency of the voltage to be maintained at the microgrid bus. In one exemplary embodiment, the voltage reference generated by the master inverter can be represented in the phasor domain as 1<0°.

Each microgrid inverter follows the voltage reference as comprised in the synchronization signal to generate a common bus voltage at the microgrid bus. Each microgrid inverter includes an inverter controller that receives the synchronization signal and adjusts the output voltage of the corresponding inverter so as to maintain the voltage of the microgrid bus corresponding to the voltage reference. Thus, with the implementation of minor correction loops for frequency/phase reflected in the synchronization signal 700, voltage magnitude and the phase/frequency of the microgrid inverters can be regulated. The shape of the synchronization signal as shown in FIG. 7 is sinusoidal, however, the shape of the synchronization signal can be triangular, rectangular, or any other shape.

Figure 8:
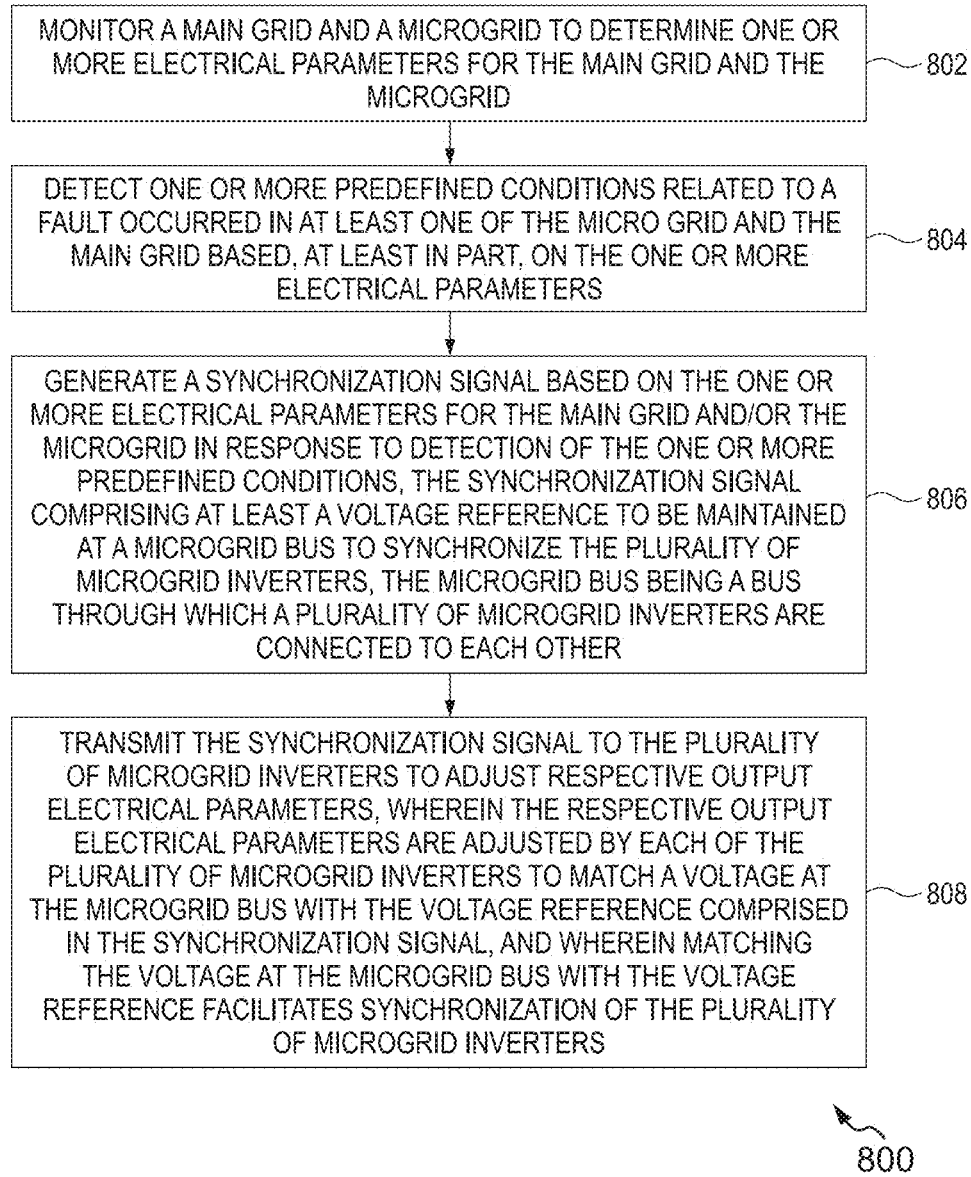
FIG. 8 is a flowchart illustrating a method for synchronizing the microgrid inverters, in accordance with an embodiment of the present disclosure.

FIG. 8 is a flowchart illustrating a method 800 for synchronizing the microgrid inverters with each other, in accordance with an embodiment of the present disclosure. The method 800 depicted in the flow diagram may be executed by, for example, the master controller. Operations of the flow diagram of the method 800, and combinations of operations in the flow diagram of the method 800, may be implemented by, for example, hardware, firmware, a processor, circuitry, and/or a different device associated with the execution of software that includes one or more computer program instructions. The method 800 starts at operation 802.

At 802, method 800 includes monitoring, by a master inverter, the main grid and the microgrid to determine one or more electrical parameters for the main grid and the microgrid.

At 804, the method 800 includes detecting, by the master inverter, one or more predefined conditions related to a fault that occurred in at least one of the microgrid and the main grid based, at least in part, on the one or more electrical parameters.

At 806, the method 800 includes generating, by the master inverter, a synchronization signal based on the one or more electrical parameters for the main grid and/or the microgrid in response to detection of the one or more predefined conditions, the synchronization signal comprising at least a voltage reference to be maintained at a microgrid bus to synchronize the microgrid inverters, the microgrid bus being a bus through which the plurality of microgrid inverters are connected.

At 808, the method 800 includes transmitting, by the master inverter, the synchronization signal to the plurality of microgrid inverters to adjust respective output electrical parameters. The respective output electrical parameters are adjusted by each of the plurality of microgrid inverters to match a voltage at the microgrid bus with the voltage reference comprised in the synchronization signal, and matching the voltage at the microgrid bus with the voltage reference facilitates synchronization of the plurality of microgrid inverters.

The disclosed method 800 with reference to FIG. 8, or one or more operations of the method 800 may be implemented using software including computer-executable instructions stored on one or more computer-readable media (e.g., non-transitory computer-readable media, such as one or more optical media discs, volatile memory components (e.g., DRAM or SRAM)), or nonvolatile memory or storage components (e.g., hard drives or solid-state nonvolatile memory components, such as Flash memory components) and executed on a computer (e.g., any suitable computer, such as a laptop computer, netbook, Web book, tablet computing device, smartphone, or other mobile computing devices). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means includes, for example, the Internet, the World Wide Web, an intranet, software applications, cable (including fiber optic cable), magnetic communications, electromagnetic communications (including RF, microwave, satellite, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software, and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer-readable media. Non-transitory computer-readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer-readable media. Examples of transitory computer-readable media include electric signals, optical signals, and electromagnetic waves. Transitory computer-readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations which are different than those which are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A system for synchronizing a plurality of microgrid inverters in a microgrid, the system comprising:
   a master inverter operatively connected to a main grid and the plurality of microgrid inverters of the microgrid, the master inverter configured, at least in part, to:
   monitor the main grid and the microgrid to determine one or more electrical parameters for the main grid and the microgrid;
   detect one or more predefined conditions related to a fault that occurred in at least one of the microgrid and the main grid based, at least in part, on the one or more electrical parameters;
   generate a synchronization signal based on the one or more electrical parameters for the main grid and/or the microgrid in response to detection of the one or more predefined conditions, the synchronization signal comprising at least a voltage reference to be maintained at a microgrid bus to synchronize the plurality of microgrid inverters, the microgrid bus being a bus through which the plurality of microgrid inverters are connected to each other; and
   transmit the synchronization signal to the plurality of microgrid inverters to adjust respective output electrical parameters, wherein the respective output electrical parameters are adjusted by each of the plurality of microgrid inverters to match a voltage at the microgrid bus with the voltage reference comprised in the synchronization signal, and wherein matching the voltage at the microgrid bus with the voltage reference facilitates synchronization of the plurality of microgrid inverters.

2. The system as claimed in claim 1, wherein the voltage reference corresponds to a voltage of a bus of the main grid, and wherein matching the voltage at the microgrid bus with the voltage reference facilitates synchronization of the microgrid with the main grid.

3. The system as claimed in claim 1, wherein the one or more electrical parameters comprise at least one of a voltage magnitude, a phase angle, a phase sequence, and a frequency.

4. The system as claimed in claim 2, further comprising a tie breaker connected between the microgrid and the main grid and configured to connect or disconnect the microgrid with the main grid, the tie breaker configured to move between a closed position in which the microgrid is connected to the main grid and an opened position in which the microgrid is disconnected from the main grid.

5. The system as claimed in claim 4, wherein, upon the synchronization of the microgrid with the main grid, the master inverter is further configured to transmit a tie breaker control signal to facilitate the tie breaker to move into the closed position.

6. The system as claimed in claim 1, wherein the plurality of microgrid inverters are connected to a plurality of electrical sources respectively for supplying electrical power, wherein, upon the synchronization of the microgrid inverters, power delivered by each of the plurality of electrical sources is based on impedances associated with the plurality of electrical sources and phase angles difference between voltages of the plurality of sources.

7. The system as claimed in claim 6, wherein a difference (ΔP) between power delivered by at least two electrical sources of the plurality of electrical sources is reduced through a phase droop control technique, and wherein the reduced difference ($\Delta P_{new}$) between the power delivered by the at least two electrical sources of the plurality of electrical sources through the phase droop control technique is given by $$\Delta P_{new} = \Delta P - P_l * \frac{m * \Delta P}{\delta_l}$$

wherein $P_l$ is an expected power delivered by each of the plurality of electrical sources when each of the plurality of microgrid inverters and impedance of each of the plurality of electrical sources are identical, wherein $\delta_l$ is a load phase angle corresponding to the expected power ($P_l$), and wherein m is a droop coefficient defined for the phase droop control technique.

8. The method as claimed in claim 7, wherein the droop coefficient is dependent on a characteristic impedance of one of the at least two electrical sources for which the phase droop control technique is implemented.

9. The method as claimed in claim 8, wherein, to nullify the difference between the power delivered by the at least two electrical sources, the droop coefficient for the electrical source is determined as a ratio of the load power angle ($\delta_l$) to the expected power ($P_l$).

10. A method comprising:
monitoring, by a master inverter, a main grid and a microgrid to determine one or more electrical parameters for the main grid and the microgrid;
detecting, by the master inverter, one or more predefined conditions related to a fault occurred in at least one of the microgrid and the main grid based, at least in part, on the one or more electrical parameters;
generating, by the master inverter, a synchronization signal based on the one or more electrical parameters for the main grid and/or the microgrid in response to detection of the one or more predefined conditions, the synchronization signal comprising at least a voltage reference to be maintained at a microgrid bus to synchronize the plurality of microgrid inverters, the microgrid bus being a bus through which a plurality of microgrid inverters are connected to each other; and
transmitting, by the master inverter, the synchronization signal to the plurality of microgrid inverters to adjust respective output electrical parameters, wherein the respective output electrical parameters are adjusted by each of the plurality of microgrid inverters to match a voltage at the microgrid bus with the voltage reference comprised in the synchronization signal, and wherein matching the voltage at the microgrid bus with the voltage reference facilitates synchronization of the plurality of microgrid inverters.

11. The method as claimed in claim 10, wherein the one or more electrical parameters comprise at least one of a voltage magnitude, a phase angle, a phase sequence, and a frequency.

12. The method as claimed in claim 10, wherein the plurality of microgrid inverters are connected to a plurality of electrical sources respectively for supplying electrical power, wherein, upon the synchronization of the microgrid inverters, power delivered by each of the plurality of electrical sources is based on impedances associated with the plurality of electrical sources and phase angles difference between voltages of the plurality of sources.

13. The method as claimed in claim 12, wherein a difference (ΔP) between power delivered by at least two electrical sources of the plurality of electrical sources is reduced through a phase droop control technique, and wherein the reduced difference ($\Delta P_{new}$) between the power delivered by the at least two electrical sources of the plurality of electrical sources through the phase droop control technique is given by $$\Delta P_{new} = \Delta P - P_l * \frac{m * \Delta P}{\delta_l}$$

wherein $P_l$ is an expected power delivered by each of the plurality of electrical sources when each of the plurality of microgrid inverters and impedance of each of the plurality of electrical sources are identical, wherein $\delta_l$ is a load phase angle corresponding to the expected power ($P_l$), and wherein m is a droop coefficient defined for the phase droop control technique.

14. The method as claimed in claim 13, wherein the droop coefficient is dependent on a characteristic impedance of one of the at least two electrical sources for which the phase droop control technique is implemented.

15. The method as claimed in claim 14, wherein, to nullify the difference between the power delivered by the at least two electrical sources, the droop coefficient for the electrical source is determined as a ratio of the load power angle ($\delta_l$) to the expected power ($P_l$).

16. A system, comprising:
a microgrid;
a master inverter operatively connected to a main grid and a plurality of microgrid inverters of the microgrid, the master inverter configured, at least in part, to:
monitor the main grid and the microgrid to determine one or more electrical parameters for the main grid and the microgrid;
detect one or more predefined conditions related to a fault that occurred in at least one of the microgrid and the main grid based, at least in part, on the one or more electrical parameters;

generate a synchronization signal based on the one or more electrical parameters for the main grid and/or the microgrid in response to detection of the one or more predefined conditions, the synchronization signal comprising at least a voltage reference to be maintained at a microgrid bus to synchronize the plurality of microgrid inverters, the microgrid bus being a bus through which the plurality of microgrid inverters are connected to each other; and transmit the synchronization signal to the plurality of microgrid inverters to adjust respective output electrical parameters, wherein the respective output electrical parameters are adjusted by each of the plurality of microgrid inverters to match a voltage at the microgrid bus with the voltage reference comprised in the synchronization signal, and wherein matching the voltage at the microgrid bus with the voltage reference facilitates synchronization of the plurality of microgrid inverters.

* * * * *

UNITED STATES PATENT AND TRADEMARK OFFICE
CERTIFICATE OF CORRECTION

| | | |
|---|---|---|
| PATENT NO. | : 12,413,077 B2 | Page 1 of 1 |
| APPLICATION NO. | : 18/930379 | |
| DATED | : September 9, 2025 | |
| INVENTOR(S) | : Chaitanya Mandela et al. | |

It is certified that error appears in the above-identified patent and that said Letters Patent is hereby corrected as shown below:

In the Claims

Claim 8, (Column 23, Line 46):
Change "The method" to --The system--

Claim 9, (Column 23, Line 50):
Change "The method" to --The system--

Signed and Sealed this
Twenty-first Day of October, 2025

John A. Squires
*Director of the United States Patent and Trademark Office*